(12) United States Patent
Dobson et al.

(10) Patent No.: US 11,405,254 B2
(45) Date of Patent: Aug. 2, 2022

(54) SPREAD OFDM FOR RADIO FREQUENCY COMMUNICATIONS

(71) Applicant: Rurisond, Inc., Redwood City, CA (US)

(72) Inventors: William Kurt Dobson, Draper, UT (US); Wayne Radochonski, Vacaville, CA (US); Tom Riddle, Belmont, CA (US)

(73) Assignee: RURISOND, INC., Redwood City, CA (US)

( * ) Notice: Subject to any disclaimer, the term of this patent is extended or adjusted under 35 U.S.C. 154(b) by 0 days.

(21) Appl. No.: 17/096,872

(22) Filed: Nov. 12, 2020

(65) Prior Publication Data

US 2022/0150100 A1 May 12, 2022

(51) Int. Cl.
*H04L 27/26* (2006.01)
*H04L 5/00* (2006.01)

(52) U.S. Cl.
CPC ........ *H04L 27/2657* (2013.01); *H04L 5/0007* (2013.01); *H04L 27/2613* (2013.01); *H04L 27/2628* (2013.01); *H04L 27/2662* (2013.01); *H04L 27/2675* (2013.01)

(58) Field of Classification Search
CPC .................. H04L 27/2628; H04L 27/2763; H04L 5/0007
See application file for complete search history.

(56) References Cited

U.S. PATENT DOCUMENTS

| | | | | |
|---|---|---|---|---|
| 2008/0159434 | A1* | 7/2008 | Park | H04L 27/2608 375/296 |
| 2008/0232504 | A1* | 9/2008 | Ma | H04L 5/0048 375/267 |
| 2009/0022252 | A1* | 1/2009 | Goh | H04L 25/0212 375/344 |
| 2016/0197756 | A1* | 7/2016 | Mestdagh | H04L 27/2649 375/295 |
| 2021/0051048 | A1* | 2/2021 | Ernstrom | H04L 5/0048 |
| 2021/0067397 | A1* | 3/2021 | Liston | H04L 27/261 |

\* cited by examiner

*Primary Examiner* — Kevin Kim
(74) *Attorney, Agent, or Firm* — Jennifer Hayes; Nixon Peabody LLP

(57) ABSTRACT

System and methods enabling radio communications that are operating in noisy environments using OFDM (Orthogonal Frequency Division Multiplexing) are disclosed. A spread OFDM transmitter that generates OFDM symbols that may include multiple copies of IFFT symbols is disclosed. A spread OFDM receiver is disclosed for receiving the spread OFDM symbols. Other methods for symbol detection, frequency offset correction, and equalization are disclosed.

35 Claims, 4 Drawing Sheets
(1 of 4 Drawing Sheet(s) Filed in Color)

| QAMSize | NumFFTperSymbol | | | | | | | |
|---|---|---|---|---|---|---|---|---|
| | 1 | 2 | 4 | 8 | 16 | 32 | 64 | 128 |
| 2 | 865 | 432 | 216 | 108 | 54 | 27 | 14 | |
| 4 | | | | | | | | |
| 16 | | 1730 | 865 | 432 | 216 | 108 | 54 | 27 |
| 64 | | 3459 | 1730 | 865 | 432 | 216 | 108 | 54 |
| 256 | | 6919 | 3459 | 1730 | 865 | 432 | 216 | 108 |
| 1024 | | 13838 | 6919 | 3459 | 1730 | 865 | 432 | 216 |

Figure 4

SPREAD OFDM FOR RADIO FREQUENCY COMMUNICATIONS

BACKGROUND

1. Field

The present disclosure relates to a system and method for radio communications, and specifically, the use of OFDM for radio communications in noisy and changing channels.

2. Related Art

Orthogonal Frequency Division Multiplexing or OFDM is a type of digital transmission and has been widely adopted. OFDM is used in applications such as digital television and audio broadcasting, DSL communications, wireless networks, and 4G/5G mobile communications. There are a multitude of technical reasons that OFDM has dominated including spectral efficiency, ability to solve multi-path, Doppler, frequency dependent delay (group delay) in a simple, low complexity way. Older methods to deal with these channel impairments required extremely complex RF and baseband hardware, with remarkably high computational loads.

OFDM is a specialized frequency division multiplexing (FDM) where all sub-carriers are orthogonal to one another thus eliminating crosstalk between sub-carriers. The orthogonality allows for an efficient transmitter/receiver design by using an IFFT (or inverse Fast Fourier Transform) for the transmitter and FFT for the receiver. Referring to FIG. 1, a prior art system 100 using OFDM transmitter 151 and OFDM receiver 152 is shown. OFDM transmitter 151 includes a mapping block 150, serial to parallel block 115, IFFT block 120, a CP Insertion block 125, and a parallel to serial block 150.

In the mapping block 110, the input data and the pilot tones are phase mapped according to the modulating scheme selected and are represented as a complex signal. Pilot tones or pilot signals are usually a single frequency signal used for equalization purposes; the location of the pilot tones and the constellation points are known a priori at the receiver. The modulating scheme can be QAM (Quadrature Amplitude Modulation) e.g. 16-QAM, 64-QAM, 256-QAM etc.

Data is then parallelized (grouped to be allocated to the orthogonal subcarriers) in the serial to parallel block 115. In the IFFT block 120, an inverse FFT is computed on each set of complex symbols to generate a time domain signal.

The last part of the OFDM signal is copied and inserted at the beginning of the signal in the cycle prefix (CP) insertion block 125. This insertion creates a guard time without creating a discontinuity. The CP should be equal or greater than the time dispersion of the signals.

The signal is converted back into a serial format in the parallel to serial block 150 block. The signal is transmitted over the channel 155 and is received by the OFDM receiver 152. In the OFDM receiver 152, the steps performed by the transmitter 151 are done in the reverse. First, the data is parallelized at the serial to parallel block 160, and then, the cyclic prefix is removed at the remove CP block 165. An FFT is performed in the FFT block 175 to get complex symbols. The output data is generated after the complex data is de-mapped in the demapping block 195 after being the data is parallelized in the parallel to serial block 185.

OFDM use is widespread but is sensitive to Doppler shift and has a poor power efficiency as it suffers from a high PAPR (Peak Power to Average Power Ratio). In addition, OFDM is also sensitive to frequency synchronization problems. OFDM cannot work in noisy channel, for instance non-line of sight communication, where there is potential for both groundwave and skywave signal to arrive at the receiver. In this case there is multi-path with Doppler shift.

Traditional OFDM methods (TOFDM hereafter) are widely used. TOFDM is sensitive to carrier offset frequency between the transmitter and receiver, as well as frame synchronization. And, although TOFDM is capable of solving many of the channel impairments related to multi-path, it does not allow operation at low or negative signal to noise ratio (SNR) values.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Embodiments of the invention relate to an OFDM communications technology that provides technical benefits to counter the channel impairments and extended for operation in harsh environments. Spread OFDM solves the problems with TOFDM and provides the technical benefits of TOFDM but extends the useful SNR range greatly and in particular handles cases where multipath signals contain Doppler shift, and where both groundwave and skywave signals arrive at the receiver. Spread OFDM also has a frame synchronization method whereby precise timing can be recovered even in very harsh (negative SNR) conditions.

A system and method are disclosed using a spread OFDM transmitter and spread OFDM receiver that adapts to noisy channel and changing channel conditions by varying the NumFFTperSymbol (or number of IFFT added to OFDM symbol) or changing the QAMSize (or modulation scheme or constellation size e.g. QAM2, QAM4, QAM64 etc.) or by varying both NumFFTperSymbol and QAMSize.

In the case of a degrading channel SNR, NumFFTperSymbol is increased or the QAMSize is decreased or by both—increasing NumFFTperSymbol and decreasing QAMSize.

To increase the bit rates, NumFFTperSymbol is decreased or the QAMSize is increased or both NumFFTperSymbol is decreased and QAMSize is increased.

Frame Alignment can be achieved using PN Sequence match and multi-stage alignment or just PN sequence match or just one of the steps within the multi-stage match.

Carrier offset correction is achieved by including a reference tone frequency in the spread OFDM symbol and the spread OFDM receiver uses the reference tone frequency to measure the frequency error by performing an FFT on the entire frame of received data, the measured frequency error is passed to a Hilbert transform to correct the frequency offset error.

Aspects of embodiments disclosed herein relate to a complex channel equalizer. The spread OFDM symbol includes pilot tones. A complex vector equalization correction factor EQ is computed by dividing known modulation of the pilot tones and computed complex vector of the received data. The complex equalization factor EQ is interpolated for remaining data to generate the complex channel equalization factor vEQ; which is then used to equalize all the symbols of the received data after performing an FFT on each of the symbols received.

The pilot tones (NumPilotTones, LocPilotTones), reference tone (ReftoneFrequence (reference tone frequency typically 1.5 kHz)), ReftoneLength (length of the reference tone), RefToneAmplitude (amplitude of the reference tone), PN sequence (PN_Type (the exact polynomial used for generation of the PN e.g. PN15), PN_length (length of the PN, typically it will match the frame length), and PN amplitude (amplitude of the PN) can be changed.

Embodiments are also directed to a system having an spread OFDM transmitter and spread OFDM receiver, in which functional blocks can be implemented by SDR or processors, software instructions stored in memory and using discrete components (such as processors, DSP (Digital Signal Processor) and memory), SoCs (System-on-Chip), ASICs (Application Specific Integrated Circuit), FPGA (Field Programmable Gate Arrays) or a combination of these.

The spread OFDM transmitter includes an OFDM Spreader, which can change the NumFFTperSymbol or number of IFFT symbols in OFDM symbol; a PN Sequence generator, where the exact length of the PN sequence is same as the number of spread OFDM symbols (NumFFTperSymbol+CP) and amplitude is programmable; a reference tone frequency generator, where a constant frequency whose exact length is same as the number of spread OFDM symbols (NumFFTperSymbol+CP) is generated and amplitude is programmable; and a combiner, which can add the spread OFDM symbols, PN sequence and reference tones to allow for simultaneous transmission of these waveforms. The combiner can support simultaneous transmission, TDM, or FDM of the spread OFDM symbols, PN sequence and reference tone. The spread OFDM transmitter can change the modulation and the QAMSize. The spread OFDM transmitter can also change the number of spread OFDM symbols, QAMSize and correspondingly other waveforms, such as the pilot tones (NumPilotTones, LocPilotTones); reference tone (ReftoneFrequence (reference tone frequency typically 1.5 kHz), ReftoneLength (length of the reference tone), and RefToneAmplitude (amplitude of the reference tone); PN sequence (PN_Type (the exact polynomial used for generation of the PN e.g. PN15), PN_length (length of the PN, typically it will match the frame length), and amplitude (PN_amplitude)) to adapt to changing channel conditions or rate adaption.

The spread OFDM receiver supports frame alignment, frequency offset correction, complex channel equalizer, and modulation and can receive spread OFDM symbols along with PN sequence and reference tones.

In accordance with a first aspect of the invention, a method is disclosed that includes, using a spread OFDM transmitter, adapting to a noisy channel or changing channel conditions by changing a number of inverse Fast Fourier Transforms (IFFTs) added to an OFDM symbol, changing a quadrature amplitude modulation (QAM) size of the OFDM symbol or changing both the number of IFFTs added to the OFDM symbol and changing the QAM size.

The noisy channel may comprise a degrading SNR, and the method may further include one or more of increasing the number of IFFTs added to the OFDM symbol and decreasing the QAM size.

The method may further include increasing the bit rate by one or more of decreasing the number of IFFTs added to the OFDM symbol and increasing the QAM size.

The method may further include performing frame alignment.

Performing frame alignment may include using one or more of a PN sequence match and multi-stage alignment.

Performing frame alignment using multi-stage alignment may include using a sliding correlator to detect CP and the additional IFFTs (NumFFTperSymbol) inserted into the spread OFDM symbol. And, the method may further include summing individual correlations of each symbol component.

The method may further include performing carrier offset correction. Performing carrier offset correction may include including a reference tone frequency in the spread OFDM symbol. The method may further include, using, a spread OFDM receiver, the reference tone frequency to measure frequency offset error by performing a Fast Fourier Transform (FFT) on an entire frame of received data. A measured frequency error may be provided to a Hilbert transform to correct the measured frequency offset error.

The method may further include performing complex channel equalization. The spread OFDM symbol may include pilot tones, and performing complex channel equalization may include computing complex vector equalization correction factor EQ by dividing a known modulation of the pilot tones and a computed complex vector of received data; interpolating the complex equalization factor EQ for other data to generate a complex channel equalization factor vEQ; and equalizing symbols in the received data after performing an FFT on each of the symbols in the received data.

The method may further include changing one or more of the number of spread OFDM symbols, QAM size, number of pilot tones, location of pilot tones, reference tone frequency, reference tone length, reference tone amplitude, PN polynomial, PN length, or PN amplitude to adapt to changing channel conditions or rate adaption.

In accordance with another aspect of the invention, a system is disclosed that includes a spread OFDM transmitter configured to adapt to a noisy channel or changing channel conditions by changing a number of inverse Fast Fourier Transforms (IFFTs) added to an OFDM symbol, changing a quadrature amplitude modulation (QAM) size of the OFDM symbol or changing both the number of IFFTs added to the OFDM symbol and changing the QAM size.

The noisy channel may include a degrading SNR, and the system may be configured to one or more of increase the number of IFFTs added to the OFDM symbol and decrease the QAM size.

The system may be configured to increase the bit rate by one or more of decrease the number of IFFTs added to the OFDM symbol and increasing the QAM size.

The system may further include a spread OFDM receiver, and the spread OFDM receiver may include a frame aligner to configured to perform frame alignment using one or more of a PN sequence match and multi-stage alignment.

The system may further include a spread OFDM receiver, and the spread OFDM receiver may include a carrier offset corrector configured to perform carrier offset correction by including a reference tone frequency in the spread OFDM symbol.

The system may further include a spread OFDM receiver, and the spread OFDM receiver may use the reference tone frequency to measure frequency offset error by performing a fast fourier transform (FFT) on an entire frame of received data. A measured frequency error may be provided to a Hilbert transform to correct the measured frequency offset error.

The system may further include a spread OFDM receiver, and the spread OFDM receiver may include a complex channel equalizer to perform complex channel equalization by computing complex vector equalization correction factor EQ by dividing a known modulation of pilot tones and a computed complex vector of received data, interpolate the complex equalization factor EQ for other data to generate a complex channel equalization factor vEQ, and equalize symbols in the received data after performing an FFT on each of the symbols in the received data.

The spread OFDM transmitter may be configured to change one or more of the number of spread OFDM symbols, QAM size, number of pilot tones, location of pilot tones, reference tone frequency, reference tone length, reference tone amplitude, PN polynomial, PN length, or PN amplitude to adapt to changing channel conditions or rate adaption.

In accordance with a further aspect of the invention, a radio system is disclosed that includes a spread OFDM transmitter including an OFDM spreader configured to generate spread OFDM symbols; a PN sequence generator configured to generate PN sequences; a reference tone generator configured to generate reference tones; and a combiner to combine the spread OFDM symbols, PN sequences and reference tones.

The system may further include a spread OFDM receiver in communication with the spread OFDM transmitter.

The spread OFDM receiver may be configured to perform frame alignment, frequency offset correction, complex channel equalization, and modulation.

The spread OFDM receiver may be configured to receive the spread OFDM symbols.

The spread OFDM receiver may be further configured to receive the PN sequences and reference tones.

The OFDM spreader may be configured to change the number of IFFT symbols in an OFDM symbol to generate the spread OFDM symbol.

The PN sequence generator may be configured to generate a PN sequence having a length that is the same as a number of the generated spread OFDM symbols.

The PN sequence generator may be configured to program the amplitude of the PN sequences.

The reference tone frequency generator may be configured to generate a constant frequency having a length that is same as a number of generated spread OFDM symbols.

The reference tone frequency generator may be configured to program the amplitude of the reference tone.

The reference tone generator may be configured to change the modulation and QAM size.

The spread OFDM transmitter may be configured to change one or more of the number of spread OFDM symbols and QAM size.

The spread OFDM transmitter may be configured to change one or more of the number of spread OFDM symbols, QAM size, number of pilot tones, location of pilot tones, reference tone frequency, reference tone length, reference tone amplitude, PN polynomial, PN length, or PN amplitude.

The combiner is configured to perform time-division multiplexing (TDM) or frequency-division multiplexing (FDM).

The spread OFDM transmitter may include one or more of software defined radios (SDRs) or processors, software instructions stored in memory and using one or more processors, digital signal processors (DSPs), or system-on-chips (SoCs), application specific integrated circuits (ASICs), field programmable gate arrays (FPGAs), or a combination thereof.

BRIEF DESCRIPTION OF DRAWINGS

The accompanying drawings, which are incorporated into and constitute a part of this specification, illustrate one or more examples of embodiments and, together with the description of example embodiments, serve to explain the principles and implementations of the embodiments. This patent or application file contains at least one drawing executed in color. Copies of this patent or patent application publication with color drawing(s) will be provided by the Office upon request and payment of the necessary fee.

FIG. 4 shows an exemplary table used for rate adaptation showing corresponding NumFFTperSymbol and QAMSize for different bit rates.

Table 1 shows an exemplary table used for rate adaptation showing corresponding NumFFTperSymbol and QAMSize for different bit rates.

DETAILED DESCRIPTION

Embodiments will be described below in more detail with reference to the accompanying drawings. The following detailed descriptions are provided to assist the reader in gaining a comprehensive understanding of the methods, apparatuses, and/or systems described herein and equivalent modifications thereof. Accordingly, various changes, modifications, and equivalents of the methods, apparatuses, and/or systems described herein will be apparent to those of ordinary skill in the art. Moreover, descriptions of well-known functions and constructions may be omitted for increased clarity and conciseness.

The terms used in the description are intended to describe embodiments only, and shall by no means be restrictive. Unless clearly used otherwise, expressions in a singular from include a meaning of a plural form. In the present description, an expression such as "comprising" or "including" is intended to designate a characteristic, a number, a step, an operation, an element, a part or combinations thereof, and shall not be construed to preclude any presence or possibility of one or more other characteristics, numbers, steps, operations, elements, parts or combinations thereof.

System and methods are disclosed for radio communications that operate in noisy environments using OFDM (Orthogonal Frequency Division Multiplexing) are disclosed. A spread OFDM transmitter is disclosed that generates OFDM symbols that may include multiple copies of an IFFT symbol. A spread OFDM receiver is also disclosed for receiving the spread OFDM symbols. Other methods for symbol detection, frequency offset correction, and equalization are disclosed.

Figure 1:
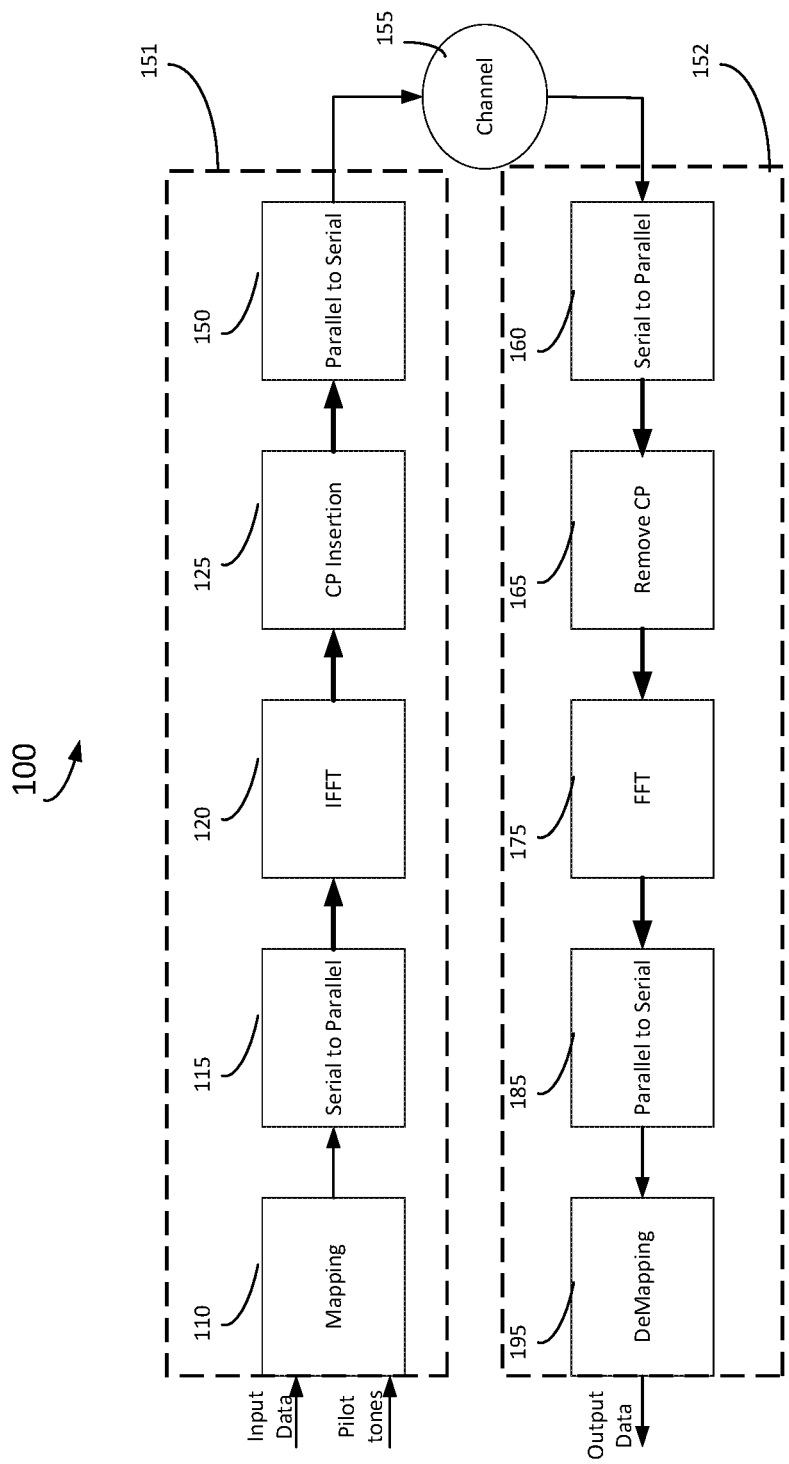
FIG. 1 is a block diagram of a system using a prior art OFDM transmitter and receiver.
Figure 2:
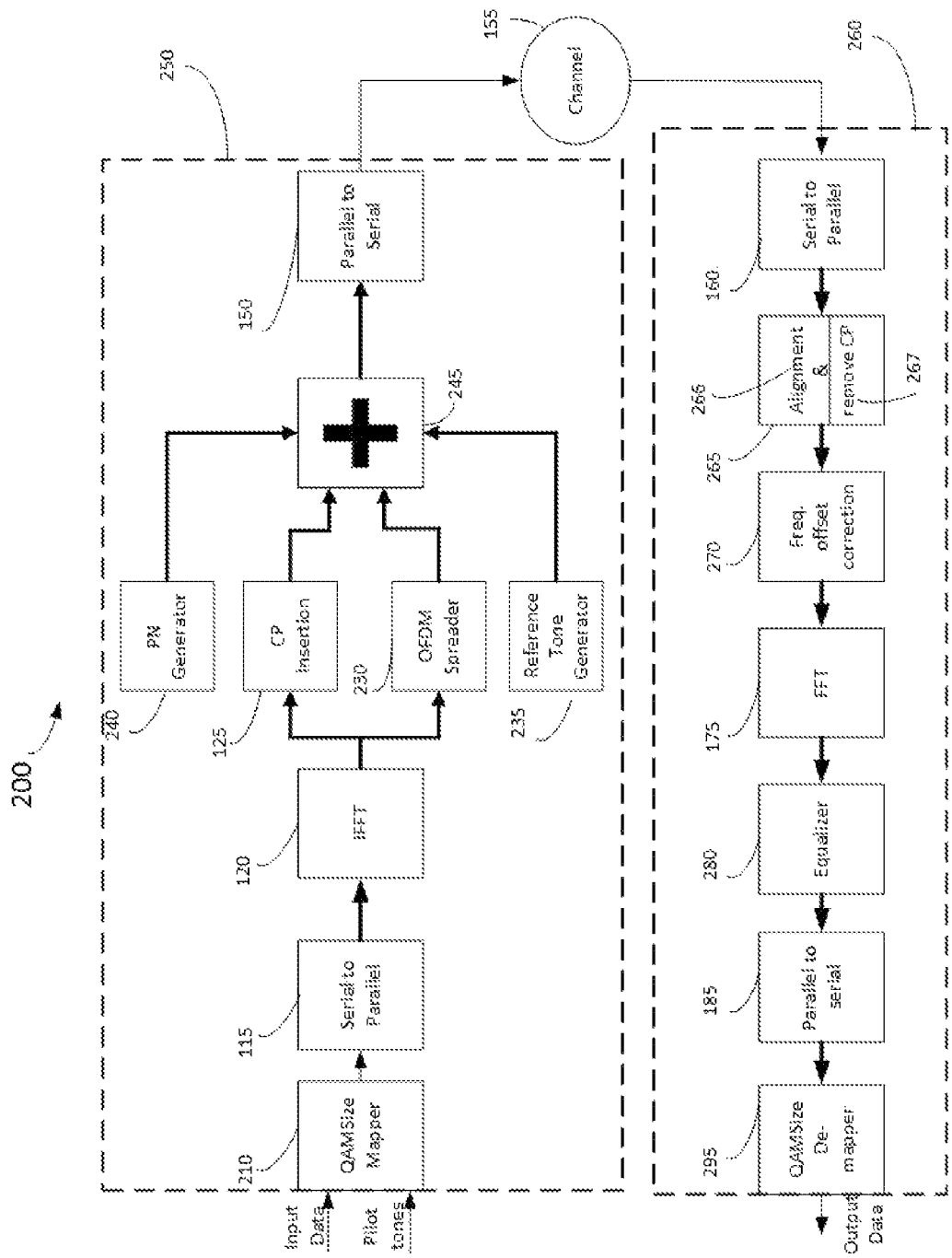
FIG. 2 is a block diagram of a system using a spread OFDM transmitter and a spread OFDM receiver in accordance with an embodiment of the invention.

FIG. 2 shows an exemplary block diagram of a system 200 having a spread OFDM transmitter and a spread OFDM receiver. FIG. 2 is a simplified diagram of system 200 and does not show details such as analog components (DAC/ADC, antenna etc.), which persons of skill in the art would understand are included in the system 200. FIG. 2 also omits details pertaining to the control and management planes as known to persons of skill in the art. FIG. 2 also does not show details such as scrambler, error correction, etc. as known to persons of skill in the art. A number of the blocks common with FIG. 1 are shown in FIG. 2, whose functioning is generally described associated with the foregoing description.

In FIG. 2, the spread OFDM transmitter 250 and spread OFDM receiver 260 are similar to the OFDM transmitter 151 and OFDM receiver 152 of FIG. 1, except that the spread OFDM transmitter 250 and spread OFDM receiver 260 can operate in noisy channels 155 and can adapt to changing channel conditions.

The spread OFDM transmitter 250 includes an QAMSize Mapper 210, OFDM spreader 230, a reference tone generator 235, a PN generator 240, and a combiner 245. The OFDM spreader 230 generates an OFDM symbol. The OFDM symbol may include multiple copies of IFFT. An OFDM symbol consisting of 2 IFFTs results in +3 dB gain, which is equivalent to the spread spectrum processing gain. An OFDM signal consisting of 4 IFFT copies results in +6 dB, and so on. It will be appreciated that the number of IFFTs will vary based on the channel conditions. For example, as the noise of the channel 155 increases, more copies of IFFT can be included into the OFDM symbol. In one embodiment, the maximum number of IFFT copies is limited to 128, resulting in a +21 dB gain. Having multiple copies of IFFT included in the OFDM symbol allows for longer symbols and effectively provides more energy at the spread OFDM receiver 260 and thus providing a processing gain of 0 dB to +21 dB above the performance of a standard OFDM transmitter. The number of IFFT copies inserted into the OFDM symbol is referred to herein as NumFFTperSymbol.

The PN generator 240 (also referred to as the PN sequence of pseudo-random noise) is a spread spectrum waveform that is designed with a specific spreading gain (length) and amplitude as required by prevailing channel conditions. In one embodiment, the channel conditions are determined based on the signal to noise ratio (SNR). It may be transmitted with time-division, frequency division, or simultaneously with the OFDM symbol(s). The PN sequence is used at the receiver to compute exact frame synchronization with the OFDM symbols(s).

In an embodiment of the invention, the various attributes related to PN can be changed. The attributes are typically changed in response to changing channel conditions of the channel 155. These attributes can include PN_Type (the exact polynomial used for generation of the PN e.g. PN15), PN_length (length of the PN, typically it will match the frame length), and PN_amplitude (amplitude).

The signal transmitted by the Spread OFDM transmitter 250 includes a reference tone generated at reference tone generator 235. The reference tone frequency is typically 1.5 kHz with a suitable length to allow detection with margin based on prevailing channel SNR. The reference tone may have a reduced amplitude and transmitted simultaneously with the OFDM data, time-division multiplexed, or frequency division multiplexed. The receiver algorithm calculates the carrier offset from the difference in the transmitted tone frequency and received tone frequency, thereby providing an offset value for a Hilbert transform at the receiver prior to equalization and decoding.

In one embodiment, the various attributes of the reference tone can be changed, typically due to changing conditions of the channel 155. These attributes include ReftoneFrequency (reference tone frequency typically 1.5 kHz), ReftoneLength (length of the reference tone), and RefToneAmplitude (amplitude of the reference tone).

The combiner 245 combines the output waveforms of the OFDM spreader 230, reference tone 235, PN 240, and the CP insertion block 125. Based on the required traffic characteristics (BER—bit error rate or throughput, etc.) or changing conditions of channel 155, the NumFFTperSymbol can be modified. The lengths of the reference tone frequency and PN sequence are also adjusted accordingly. In addition to the NumFFTperSymbol, a different modulation scheme or constellation size (QAM2, QAM4, QAM16 etc.) can be selected. The modulation scheme or constellation size is referred to as QAMsize. This mapping is done in QAMSize Mapper 210. In one embodiment, the spread OFDM symbol (NumFFTperSymbol with the CP), reference tone frequency, and the PN sequence are transmitted simultaneously i.e. the reference tone, spread OFDM symbol and PN sequence are added. In another embodiment, the reference tone frequency, the PN sequence and the spread OFDM symbol (NumFFTperSymbol and the CP) are transmitted sequentially in time. This sequential nature of transmission aids in field testing and debugging. In another embodiment, the reference tone frequency, PN sequence and the spread OFDM symbol (NumFFTperSymbol and the CP) are transmitted using a time-division multiplexing (TDM), frequency-division multiplexing (FDM), simultaneously or in any combination of TDM, FDM or simultaneous transmission.

The spread OFDM transmitter 250 can change the modulation (mapping block 210) to adapt to changing conditions or traffic requirements of channel 155. For instance, if the BER increases due to the worsening channel 155 conditions, the spread OFDM transmitter 250 may select lower QAM size (QAM16 to QAM4 etc.). In one embodiment, the number of pilot tones referred to as NumPilotTones and the locations of the pilot tones (referred to as LocPilotTones) can be changed to adapt to the conditions of channel 155. Other parameters (e.g., symbol duration, sub carriers, amplitude etc.) are programmable and can be changed at run time.

The spread OFDM receiver 260 includes an alignment & remove CP 265, frequency offset correction 270, equalizer 280, QAMSize Demapper 295. The alignment & remove CP 265 includes an alignment functional alignment 266 block and remove CP 267. The spread OFDM receiver 260 estimates and finds the exact location (or alignment) of where the samples are located in the received signal before the FFT operation is performed. The remove CP 267 is similar to the remove CP block 165 in the OFDM receiver 152. In a standard OFDM receiver, the received signal includes a CP of N samples which is identical to the last N samples of the OFDM symbol. The start of the OFDM symbol can be detected by implementing a sliding correlator with a spacing equal to the length of the IFFT and length of the CP. However, as SNR (signal to noise ratio) degrades this method of alignment may fail. Alignment in spread OFDM receiver 260 is achieved using two different steps: PN Sequence Match and Multi-Stage Alignment.

PN Sequence Match

The spread OFDM receiver 260 is constantly running a matched filter (i.e. the cross relation between the received data and the PN sequence—which the receiver 260 knows a priori). Upon a match, the spread OFDM receiver 260 now knows the start and end of the OFDM packet as the PN sequence is the same length as the OFDM packet.

Multi-Stage Alignment

The alignment of the OFDM symbols are further refined by using a multi-stage frame alignment. The spread OFDM receiver 260 uses a sliding correlator to detect the CP and the additional IFFT symbols (NumFFTperSymbol) inserted into the spread OFDM packet. These additional correlations (corresponding to NumFFTperSymbol) provide additional gain on top of the standard OFDM method of using just CP. An additional third level of correlation can be achieved by summing the individual correlations of all the symbol components. Per an embodiment of the invention, the spread OFDM receiver 260 may perform all the above steps (PN sequence match, multi-stage frame alignment) or just one of the steps.

The spread OFDM receiver 260 next performs frequency offset correction at frequency offset correction block 270. This is to correct for any frequency errors due to the differences between the spread OFDM transmitter 250 and spread OFDM receiver 260 oscillator differences. The spread OFDM receiver 260 performs an FFT operation on the entire received frame to determine the reference tone frequency received versus the reference tone frequency expected (typically, 1.5 kHz). The difference (or the frequency offset error) between the received reference tone frequency and the expected frequency is calculated. This calculated frequency offset error is used, and a Hilbert transform is performed on the received frame to correct any frequency offset.

Once the received signal is frequency offset corrected, an FFT operation is performed on every symbol in the FFT functional block 175, followed by equalization (on every symbol) in the equalizer block 280. The symbols are then serialized (in parallel to serial block 185) and demodulated (QAMSize demapp-er block 295) to give the received output data.

The spread OFDM symbols include pilot tones, the location and modulation of these pilot tones (referred to as KnownEQ) are known a priori at the spread OFDM receiver 250. TxRecEQ is the complex vector of the received FFT. A complex vector EQ which is the correction factor is created by performing a complex vector division of KnownEQ by TxRecEQ. This complex vector correction factor EQ is then interpolated for the remaining data to give the equalization factor vEQ. The received signal is equalized (complex multiplication) with the interpolated equalization factor vEQ. The output of the equalizer 280 is serialized in the Parallel to serial 185 block and the output data is generated from by QAMSize de-mapper 295.

The various functional blocks of the spread OFDM transmitter 250 and spread OFDM receiver 260 can implemented using SDR or software defined radio, DSPs (Digital Signal Processor), FPGA (Field Programmable Gate Arrays), SOCs (System-on-Chip), ASICs (Application Specific Integrated Circuit). Based upon the implementation goals, some or all of the functional blocks can be implemented using processors, software instructions stored in memory and using discrete components (such as processors, DSP (Digital Signal Processor) and memory), SoCs (System-on-Chip), ASICs (Application Specific Integrated Circuit), FPGA (Field Programmable Gate Arrays) or a combination thereof.

Figure 3:
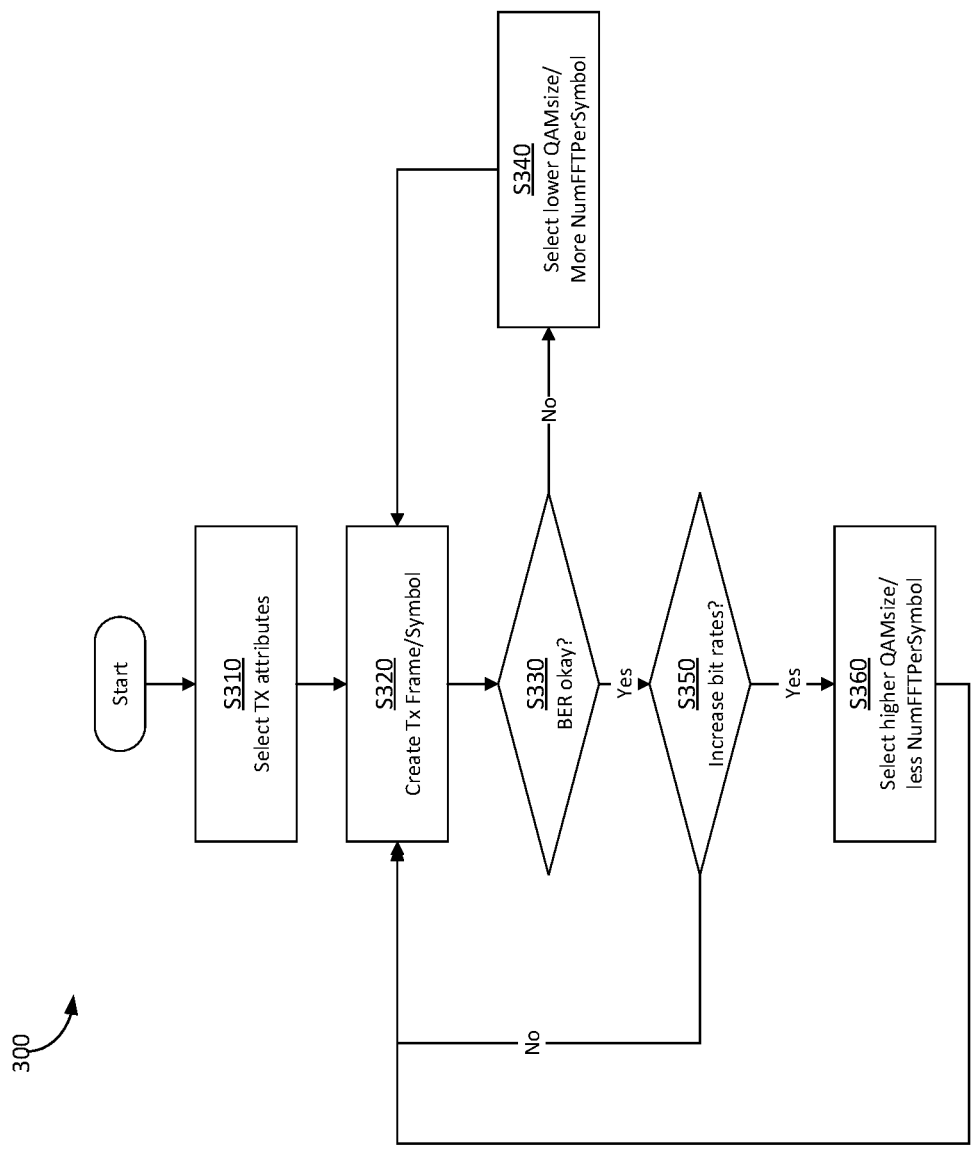
FIG. 3 is an exemplary flow showing a process for adapting to changing and noisy channels using the system of FIG. 2 in accordance with an embodiment of the invention.

FIG. 3 shows an exemplary method 300 that enables system 200 to adapt to changing and noisy channels as per an embodiment of the invention. FIG. 3 is depicted as a flowchart. Although a flowchart may describe the operations as a sequential process, many of the operations can be performed in parallel or concurrently. In addition, the order of the operations may be re-arranged. A process may correspond to a method, a procedure, etc.

The method 300 starts at block 5310, where the various TX attributes or spread OFDM transmitter 250 attributes are selected. These attributes can be based on the channel condition or transmission goals (BER and, or bit rates). The spread OFDM transmitter 250 attributes can include NumFFTperSymbol, length and amplitude of PN sequence, length and amplitude of reference tone, number and location of Pilot tones, and different modulation scheme or constellation size (QAM size or QAMSize).

At block 5320, the spread OFDM transmitter 250 creates a spread OFDM symbol based on the attributes selected in block 5320.

At block 5330, the method 300 checks to see if the BER (bit error rate) meets the requirements.

If the BER is not met, the method 300 moves to block 5340, where the spread OFDM transmitter 250 attributes are changed. For example, in response to increased errors (e.g., increased channel noise), the NumFFTperSymbol is increased. The QAM size may, also or alternatively, be decreased.

At block 5350, method 300 checks to see if the bit rate is to be increased. At block 5360, NumFFTperSymbol is decreased, and additionally or alternatively, QAM size is increased.

If the BER and bit rates are met, the spread OFDM transmitter 250 attributes are not modified.

The above method described for rate adaption is one of many possible rate negotiation schemes, and this patent does not preclude any other such methods such as ARQ (automatic repeat request), ACK/NAK (acknowledgement/negative-acknowledgement (NAK or NACK)) protocols, etc. Traffic goals (BER thresholds transmission rates etc.) are not explicitly described in this document as they are handled by the management and control plane. Although the preceding discussion has been focused on radio communication, it will be appreciated that the method 300 and system 200 can be adapted to be used in any system that uses OFDM such as DSL, digital television and audio broadcasting etc.

FIG. 4 shows an example of bit rates in system 200 for various NumFFTperSymbol and QAMSize. The spread OFDM receiver 260 and spread OFDM transmitter 250 in system 200 use a similar table in method 300 to negotiate a coordinate jump to higher/lower bit rates. In FIG. 4, shaded cells shown are the agreed upon (by the OFDM transmitter 250 and OFDM receiver 260) sequence for NumFFTperSymbol and QAMSize.

Typically, the method 300 at block 5310 selects the slowest supported bit rate 7 (NumFFTperSymbol=128 and QAMSize=2). So, if system 200 wants to move to a higher bit rate, method 300 selects a bit rate of 14 and the corresponding NumFFTperSymbol=128 and QAMSize=4. Similarly, the next higher bit rate is 27 the corresponding NumFFTperSymbol=64 and QAMSize=4. The next pre-negotiated bit rates are 14 (NumFFTperSymbol=128 and QAMSize=4), 27 (NumFFTperSymbol=64 and QAMSize=4) . . . 27676 (NumFFTperSymbol=1 and QAMSize=1024). Other possible combinations of modulation (e.g. BPSK Binary phase-shift keying) and NumFFTperSymbol are also possible. If the BER exceeds the threshold, the next lower pre-negotiated rate is selected. For instance, if the bitrate is 14 (corresponding NumFFTperSymbol=128 and QAMSize=4) if the BER threshold is exceeded method 200 would move to lower rate corresponding to a bit rate of 7 (NumFFTperSymbol=128 and QAMSize=2). System 200 can use method 300 to select the NumFFTperSymbol and modulation size/constellation for particular SNR (BER) and bit rate.

One or more of the methodologies or functions described herein may be embodied in a computer-readable medium on which is stored one or more sets of instructions (e.g., software). The software may reside, completely or at least partially, within the storage module, as described above, and/or within the processing module during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the invention. The term "computer-readable medium" shall accordingly be taken to include, but not be limited to, solid-state memories, and optical and magnetic media.

Embodiments of the invention have been described through processes or flow diagrams at times, which are defined by executable instructions recorded on computer readable media which cause a computer, microprocessors or chipsets to perform method steps when executed. The process steps have been segregated for the sake of clarity. However, it should be understood that the steps need not correspond to discreet blocks of code and the described steps can be carried out by the execution of various code portions stored on various media and executed at various times.

Although a number of possible implementations have been described, these are presented merely for the sake of explanation and teaching, and are not limiting. Moreover, an implementation of an apparatus that falls within the inventive concept does not necessarily achieve any of the possible benefits outlined above: such benefits are dependent on the specific use case and specific implementation, and the possible benefits mentioned above are simply examples.

Although the concepts have been described above with respect to the various embodiments, it is noted that there can be a variety of permutations and modifications of the described features by those who are familiar with this field, only some of which have been presented above, without departing from the technical ideas and scope of the features, which is defined by the appended claims.

Further, while this specification contains many features, the features should not be construed as limitations on the scope of the disclosure or the appended claims. Certain features described in the context of separate embodiments can also be implemented in combination. Conversely, various features described in the context of a single embodiment can also be implemented in multiple embodiments separately or in any suitable sub-combination.

Although the drawings describe operations in a specific order and/or show specific arrangements of components, and are described in the context of access segments of data centers, one should not interpret that such specific order and/or arrangements are limited, or that all the operations performed and the components disclosed are needed to obtain a desired result. There are numerous hardware and software devices that can be configured to forward data units in the manner described in the present disclosure with respect to various embodiments.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting. There are numerous other variations to different aspects of the invention described above, which in the interest of conciseness have not been provided in detail. Accordingly, other embodiments are within the scope of the claims.

The invention has been described in relation to particular examples, which are intended in all respects to be illustrative rather than restrictive. Those skilled in the art will appreciate that many different combinations will be suitable for practicing the present invention. Other implementations of the invention will be apparent to those skilled in the art from consideration of the specification and practice of the invention disclosed herein. Various aspects and/or components of the described embodiments may be used singly or in any combination. It is intended that the specification and examples be considered as exemplary only, with a true scope and spirit of the invention being indicated by the following claims.

What is claimed is:

1. A method comprising:
   using a spread OFDM transmitter, adapting to a noisy channel or changing channel conditions by changing a number of inverse Fast Fourier Transforms (IFFTs) added to an OFDM symbol, changing a quadrature amplitude modulation (QAM) size of the OFDM symbol or changing both the number of IFFTs added to the OFDM symbol and changing the QAM size; and
   performing frame alignment using one or more of a PN sequence match and multi-stage alignment.

2. The method of claim 1, wherein the noisy channel comprises a degrading SNR, and further comprising one or more of increasing the number of IFFTs added to the OFDM symbol and decreasing the QAM size.

3. The method of claim 1, further comprising increasing the bit rate by one or more of decreasing the number of IFFTs added to the OFDM symbol and increasing the QAM size.

4. The method of claim 1, wherein performing frame alignment using multi-stage alignment comprises:
   using sliding correlator to detect CP and the additional IFFTs (NumFFTperSymbol) inserted into the spread OFDM symbol.

5. The method of claim 4, further comprising summing individual correlations of each symbol component.

6. The method of claim 1, further comprising performing carrier offset correction.

7. The method of claim 6, wherein performing carrier offset correction comprises including a reference tone frequency in the spread OFDM symbol.

8. A method comprising:
   using a spread OFDM transmitter, adapting to a noisy channel or changing channel conditions by changing a number of inverse Fast Fourier Transforms (IFFTs) added to an OFDM symbol, changing a quadrature amplitude modulation (QAM) size of the OFDM symbol or changing both the number of IFFTs added to the OFDM symbol and changing the QAM size;
   performing carrier offset correction wherein performing carrier offset correction comprises including a reference tone frequency in the spread OFDM symbol; and
   using, a spread OFDM receiver, the reference tone frequency to measure frequency offset error by performing a Fast Fourier Transform (FFT) on an entire frame of received data.

9. The method of claim 8, wherein a measured frequency error is provided to a Hilbert transform to correct the measured frequency offset error.

10. The method of claim 1, further comprising performing complex channel equalization.

11. A method comprising:
    using a spread OFDM transmitter, adapting to a noisy channel or changing channel conditions by changing a number of inverse Fast Fourier Transforms (IFFTs) added to an OFDM symbol, changing a quadrature amplitude modulation (QAM) size of the OFDM symbol or changing both the number of IFFTs added to the OFDM symbol and changing the QAM size; and performing complex channel equalization;

when the spread OFDM symbol includes pilot tones, and wherein performing complex channel equalization comprises:

computing complex vector equalization correction factor EQ by dividing a known modulation of the pilot tones and a computed complex vector of received data;

interpolating the complex equalization factor EQ for other data to generate a complex channel equalization factor vEQ; and equalizing symbols in the received data after performing an FFT on each of the symbols in the received data.

12. The method of claim 1, further comprising changing one or more of the number of spread OFDM symbols, QAM size, number of pilot tones, location of pilot tones, reference tone frequency, reference tone length, reference tone amplitude, PN polynomial, PN length, or PN amplitude to adapt to changing channel conditions or rate adaption.

13. A system comprising:
a spread OFDM transmitter configured to adapt to a noisy channel or changing channel conditions by changing a number of inverse Fast Fourier Transforms (IFFTs) added to an OFDM symbol, changing a quadrature amplitude modulation (QAM) size of the OFDM symbol or changing both the number of IFFTs added to the OFDM symbol and changing the QAM size; and a spread OFDM receiver, and wherein the spread OFDM receiver comprises a frame aligner to configured to perform frame alignment using one or more of a PN sequence match and multi-stage alignment.

14. The system of claim 13, wherein the noisy channel comprises a degrading SNR, and wherein the system is configured to one or more of increase the number of IFFTs added to the OFDM symbol and decrease the QAM size.

15. The system of claim 13, wherein the system is configured to increase the bit rate by one or more of decrease the number of IFFTs added to the OFDM symbol and increasing the QAM size.

16. The system of claim 13, further comprising a spread OFDM receiver, and wherein the spread OFDM receiver comprises a carrier offset corrector configured to perform carrier offset correction by including a reference tone frequency in the spread OFDM symbol.

17. A system comprising:
a spread OFDM transmitter configured to adapt to a noisy channel or changing channel conditions by changing a number of inverse Fast Fourier Transforms (IFFTs) added to an OFDM symbol, changing a quadrature amplitude modulation (QAM) size of the OFDM symbol or changing both the number of IFFTs added to the OFDM symbol and changing the QAM size; and a spread OFDM receiver, wherein the spread OFDM receiver comprises a carrier offset corrector configured to perform carrier offset correction by including a reference tone frequency in the spread OFDM symbol and wherein the spread OFDM receiver uses the reference tone frequency to measure frequency offset error by performing a fast fourier transform (FFT) on an entire frame of received data.

18. The system of claim 17, wherein a measured frequency error is provided to a Hilbert transform to correct the measured frequency offset error.

19. A system comprising:
a spread OFDM transmitter configured to adapt to a noisy channel or changing channel conditions by changing a number of inverse Fast Fourier Transforms (IFFTs) added to an OFDM symbol, changing a quadrature amplitude modulation (QAM) size of the OFDM symbol or changing both the number of IFFTs added to the OFDM symbol and changing the QAM size; and a spread OFDM receiver, and wherein the spread OFDM receiver comprises a complex channel equalizer to perform complex channel equalization by computing complex vector equalization correction factor EQ by dividing a known modulation of pilot tones and a computed complex vector of received data, interpolate the complex equalization factor EQ for other data to generate a complex channel equalization factor vEQ, and equalize symbols in the received data after performing an FFT on each of the symbols in the received data.

20. The system of claim 13, wherein the spread OFDM transmitter is configured to change one or more of the number of spread OFDM symbols, QAM size, number of pilot tones, location of pilot tones, reference tone frequency, reference tone length, reference tone amplitude, PN polynomial, PN length, or PN amplitude to adapt to changing channel conditions or rate adaption.

21. A radio system comprising
a spread OFDM transmitter comprising:
an OFDM spreader configured to generate spread OFDM symbols;
a PN sequence generator configured to generate PN sequences;
a reference tone generator configured to generate reference tones; and
a combiner to combine the spread OFDM symbols, PN sequences and reference tones.

22. The radio system of claim 19, further comprising a spread OFDM receiver in communication with the spread OFDM transmitter.

23. The radio system of claim 22, wherein the spread OFDM receiver is configured to perform frame alignment, frequency offset correction, complex channel equalization, and modulation.

24. The radio system of claim 22, wherein the spread OFDM receiver is configured to receive the spread OFDM symbols.

25. The radio system of claim 24, wherein the spread OFDM receiver is further configured to receive the PN sequences and reference tones.

26. The radio system of claim 21, wherein the OFDM spreader is configured to change the number of IFFT symbols in an OFDM symbol to generate the spread OFDM symbol.

27. The radio system of claim 21, wherein the PN sequence generator is configured to generate a PN sequence having a length that is the same as a number of the generated spread OFDM symbols.

28. The radio system of claim 21, wherein the PN sequence generator is configured to program the amplitude of the PN sequences.

29. The radio system of claim 21, wherein the reference tone frequency generator is configured to generate a constant frequency having a length that is same as a number of generated spread OFDM symbols.

30. The radio system of claim 21, wherein the reference tone frequency generator is configured to program the amplitude of the reference tone.

31. The radio system of claim 21, wherein the reference tone generator is configured to change the modulation and QAM size.

32. The radio system of claim 21, wherein the spread OFDM transmitter is configured to change one or more of the number of spread OFDM symbols and QAM size.

33. The radio system of claim 21, wherein the spread OFDM transmitter is configured to change one or more of the number of spread OFDM symbols, QAM size, number of pilot tones, location of pilot tones, reference tone frequency, reference tone length, reference tone amplitude, PN polynomial, PN length, or PN amplitude.

34. The radio system of claim 21, wherein the combiner is configured to perform time-division multiplexing (TDM) or frequency-division multiplexing (FDM).

35. The radio system of claim 21, wherein the spread OFDM transmitter comprises one or more of software defined radios (SDRs) or processors, software instructions stored in memory and using one or more processors, digital signal processors (DSPs), or system-on-chips (SoCs), application specific integrated circuits (ASICs), field programmable gate arrays (FPGAs), or a combination thereof.

* * * * *